United States Patent [19]

Kazlauskas

[11] Patent Number: 4,556,774

[45] Date of Patent: Dec. 3, 1985

[54] WELDING APPARATUS FOR WELDING TUBES TO THE BACK FACE OF A TUBE SHEET

[76] Inventor: Gasparas Kazlauskas, 4455 Los Feliz, Apt. 1108, Los Angeles, Calif. 90027

[21] Appl. No.: 471,884

[22] Filed: Mar. 3, 1983

[51] Int. Cl.⁴ .............................................. B23K 9/16
[52] U.S. Cl. .............................. 219/60.2; 219/125.11; 219/60 A
[58] Field of Search ................. 219/60.2, 60 A, 60 R, 219/125.11, 125.1, 158, 161, 137.9, 121 LC, 121 LD

[56] References Cited

U.S. PATENT DOCUMENTS

| | | | |
|---|---|---|---|
| 3,395,262 | 7/1968 | Kazlauskas | 219/125.11 |
| 3,400,237 | 9/1968 | Kazlauskas | 219/60 A |
| 3,461,265 | 8/1969 | Spiro | 219/60 A |
| 3,702,915 | 11/1972 | Vilkas et al. | 219/137 |
| 3,708,647 | 1/1973 | Acker | 219/60 A |
| 3,746,832 | 7/1973 | Bernard et al. | 219/137.9 |
| 3,927,295 | 12/1975 | Schuster et al. | 219/60.2 |
| 4,262,187 | 4/1981 | Savor | 219/60.2 X |

Primary Examiner—C. L. Albritton
Assistant Examiner—Catherine Sigda
Attorney, Agent, or Firm—Jack C. Munro

[57] ABSTRACT

A tube sheet welding apparatus for the rear or back face of a tube sheet. The welding head apparatus includes a welding head housing with an internal opening therethrough. The particular tube to be welded is to be located through the internal opening. The welding head housing is to be separatable into two separate halves and to be clamped tightly onto the tube to be welded. The welding electrode is mounted within a welding electrode housing which is located within the welding head housing. The welding electrode, as well as the welding electrode housing, is rotated through a gear assembly to complete the welding operation of the tube to the tube sheet. After welding, the welding head housing is split apart permitting separation of such from the tube that has now been welded permitting movement of the welding head housing to another tube that is then to be welded. Inert gas is to be supplied to the welded area through an inert gas passage assembly located within the welding head housing. Electrical energy for the welding electrode is conducted through a cable which is mounted within the inert gas supply conduit.

4 Claims, 6 Drawing Figures

WELDING APPARATUS FOR WELDING TUBES TO THE BACK FACE OF A TUBE SHEET

BACKGROUND OF THE INVENTION

The field of this invention relates to automatic welding apparatuses, and more particularly to a welding apparatus which is primarily designed to facilitate welding of tubes to the back face of a tube sheet.

A heat exchanger typically consists of a shell in which are located a large number of parallel tubes for carrying cooling liquid. Steam entering the shell condenses on the tubes. At both ends of the heat exchanger, the tubes are held in position by a tube sheet. These spaced-apart tube sheets separate the steam containing shell interior from the remaining portion of the heat exchanger.

In a typical heat exchanger, there may be literally hundreds in number of tubes mounted in a closely spaced arrangement within a tube sheet. It is necessary to insure a leakless joint between each tube and the tube sheet. Rolling or expansion of the tubes into the tube sheet does not provide insurance of a leakless joint. Therefore, it is generally desirable that the tubes be welded to the tube sheet.

It has been found that by manual welding of each of the tubes to the tube sheet, insufficient quality is obtained. The inherent repetitive creating of each annular weld results in the production of an occassional poor quality weld. Even if a single tube is found to leak, that leak must be repaired. Therefore, some means must be utilized to achieve a hundred percent weld quality in every weld.

In order to achieve this hundred percent weld quality, it is common to use an automatic welding apparatus. The automatic welding apparatus is securable in a set position with respect to the welding area. Desirable weld quality is obtained through the use of an inert gas invironment to the welding electrode. The welding current and voltage is monitored through the use of a computer and instantaneous changes will be made if preset desirable perameters are not met during the welding procedure.

Welding of tubes to tube sheets can occur on either face of the tube sheet, which is normally termed either the front face or the back face. Within the front face of the tube sheet, the end of each tube is substantially flush with the front face. Within the back face of the tube sheet, the tubes extend therefrom in a closely spaced array. To achieve welding at the front face, the welding apparatus usually includes a form of a protruding mandrel assembly which extends within each tube to secure in position the welding apparatus in order to achieve the desired welding operation. An example of such a welding apparatus is shown and described within U.S. patent application, Ser. No. 445,090, which was filed Nov. 29, 1982 by the present inventor.

Within the back face, a securing mandrel could not be utilized since the tubes protrude from the back face. However, one way in which the welding assembly can be secured to the back face is for the welding apparatus to be securely mounted onto a particular tube that is to be welded to the back face. The subject matter of the present invention is directed to a welding apparatus which is to be utilized to weld tubes to the back face of a tube sheet.

SUMMARY OF THE INVENTION

It is the primary objective of the present invention to provide a fully automatic welding apparatus for welding tubes to the back face of a tube sheet, which is relatively simple and compact in construction, easy to operate and produces welds of the highest quality.

Another object of the present invention is to provide an automatic welding apparatus capable of producing a non-porous, high strength weld between the relatively thin-walled tube and a relatively thick-walled tube sheet.

A tube sheet comprises a metal sheet which includes a mass of circular shaped openings formed therein. The openings are normally equidistantly located in respect to each other. The openings are normally located in horizontal rows and vertical columns. An end of a metallic tube is to be snugly located within each opening and terminates directly adjacent the outer surface of the tube sheet, which is termed the front face. The end of the tube at the front face is to be welded to the tube sheet. This welding to the tube sheet is accomplished through the use of a welding mechanism, such as that shown and described within the aforementioned patent application, Ser. No. 445,090. Also, welding of the tube to the tube sheet is desirable at the back face of the tube sheet. As previously mentioned, the structure of the present invention is directed to automatic welding apparatus to perform the welds at the back face of the tube sheet. After each weld is completed, the welding apparatus is moved to another tube and the welding procedure repeated. This procedure is repeated until all the tubes mounted within the tube sheet are welded.

The welding apparatus of the present invention is constructed of a welding head housing within which is located a welding electrode housing. The welding head housing and the welding electrode housing are capable of being split into two separate parts. A through opening is provided through the welding head housing and the welding electrode housing. When the welding head housing and the welding electrode housing are split apart, a tube is to be located within the through opening and the welding head housing and the welding electrode housing reassembled and secured together. The welding electrode housing, which supports the welding electrode, is to be rotatable through a gear assembly along a circular path with respect to the welding head housing. The welding head housing also includes an inert gas passage assembly so that inert gas can be discharged directly adjacent the tip of the welding electrode and be evenly dispursed thereby completely flooding the area of the weld puddle. An electrical connector is in sliding engagement with the electrode housing, with the electrode housing being rotatable with respect to the connector. The connector functions to transfer electrical energy from a supply cable to the electrode housing and hence to the welding electrode. The electrical current supply cable is mounted within the inert gas supply conduit.

DETAILED DESCRIPTION OF THE SHOWN EMBODIMENT

Figure 1:
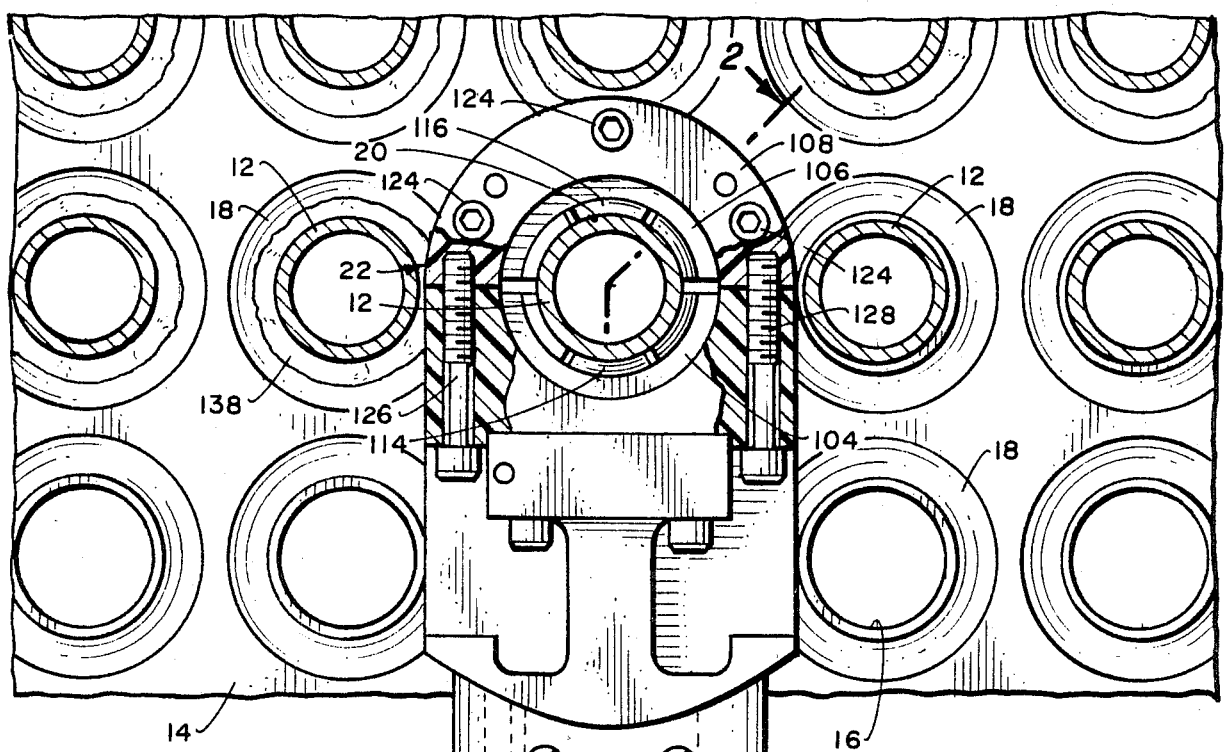
FIG. 1 is a front view, partly in crosssection of the welding apparatus of the present invention showing such mounted in a welding position to perform the welding of a tube to a tube sheet.
Figure 1:
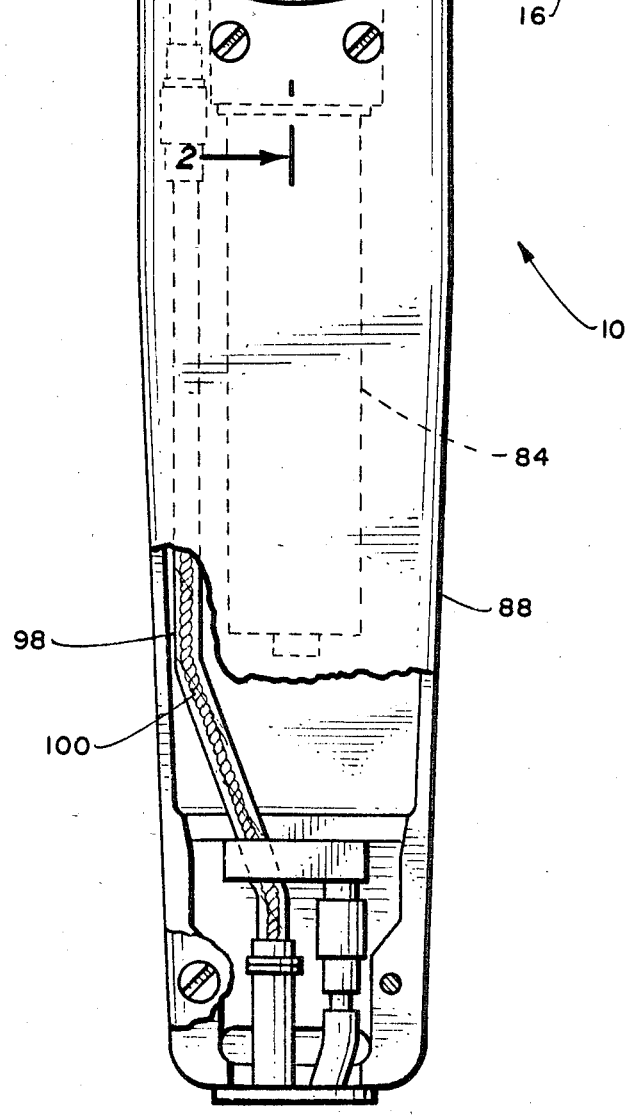
Figure 2:
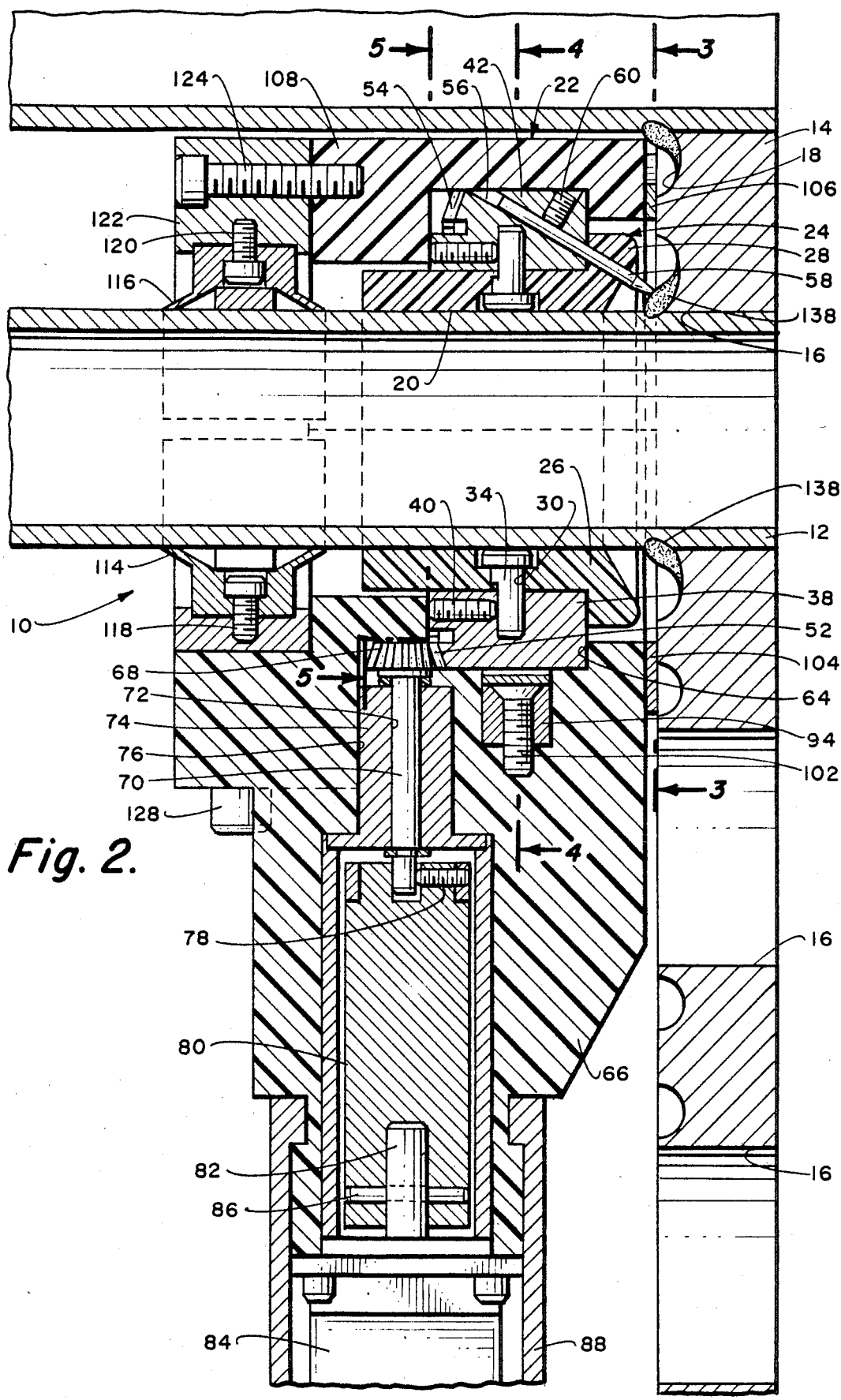
FIG. 2 is a cross-sectional view taken along line 2—2 of FIG. 1.
Figure 3:
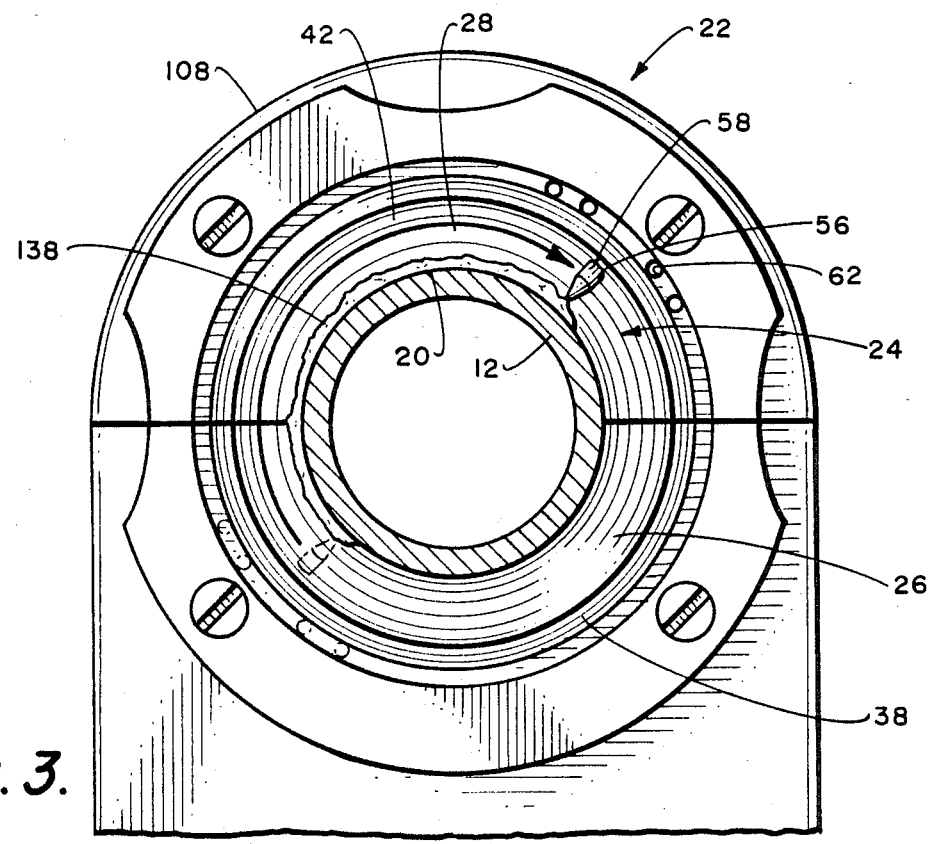
FIG. 3 is a back view of the welding apparatus of this invention taken along line 3—3 of FIG. 2.
Figure 4:
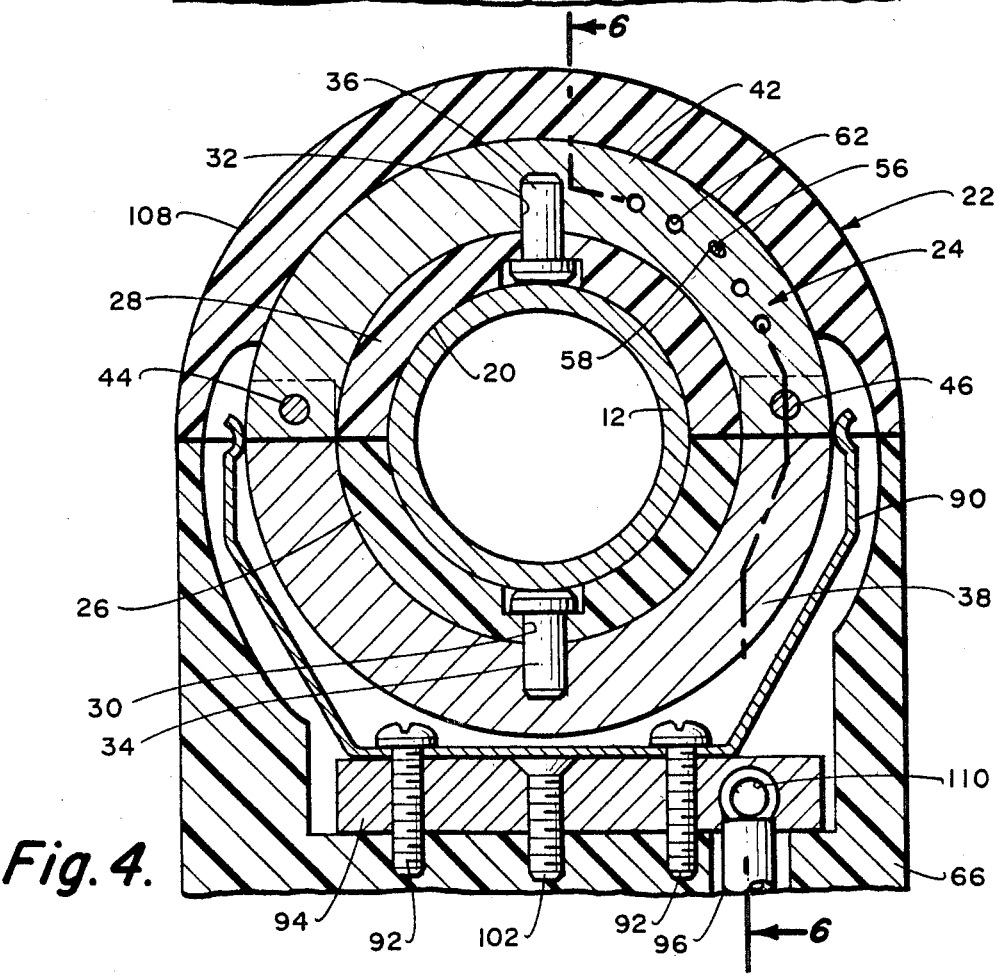
FIG. 4 is a cross-sectional view through the welding apparatus of this invention taken along line 4—4 of FIG. 2.
Figure 5:
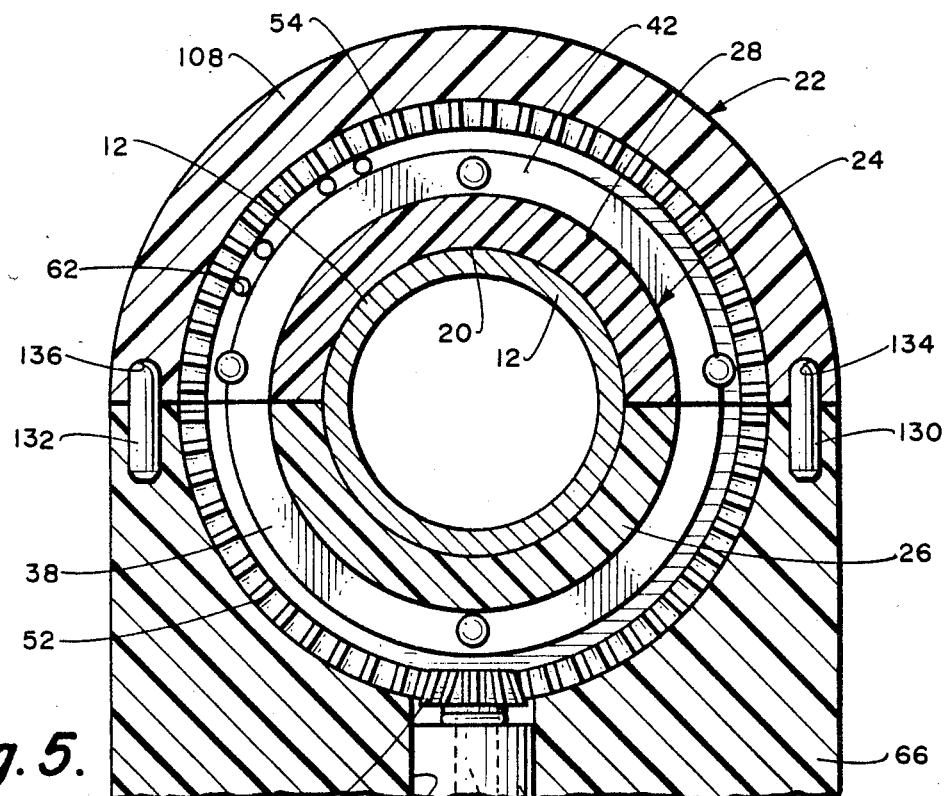
FIG. 5 is a cross-sectional view through the welding apparatus of this invention taken along line 5—5 of FIG. 2.
Figure 6:
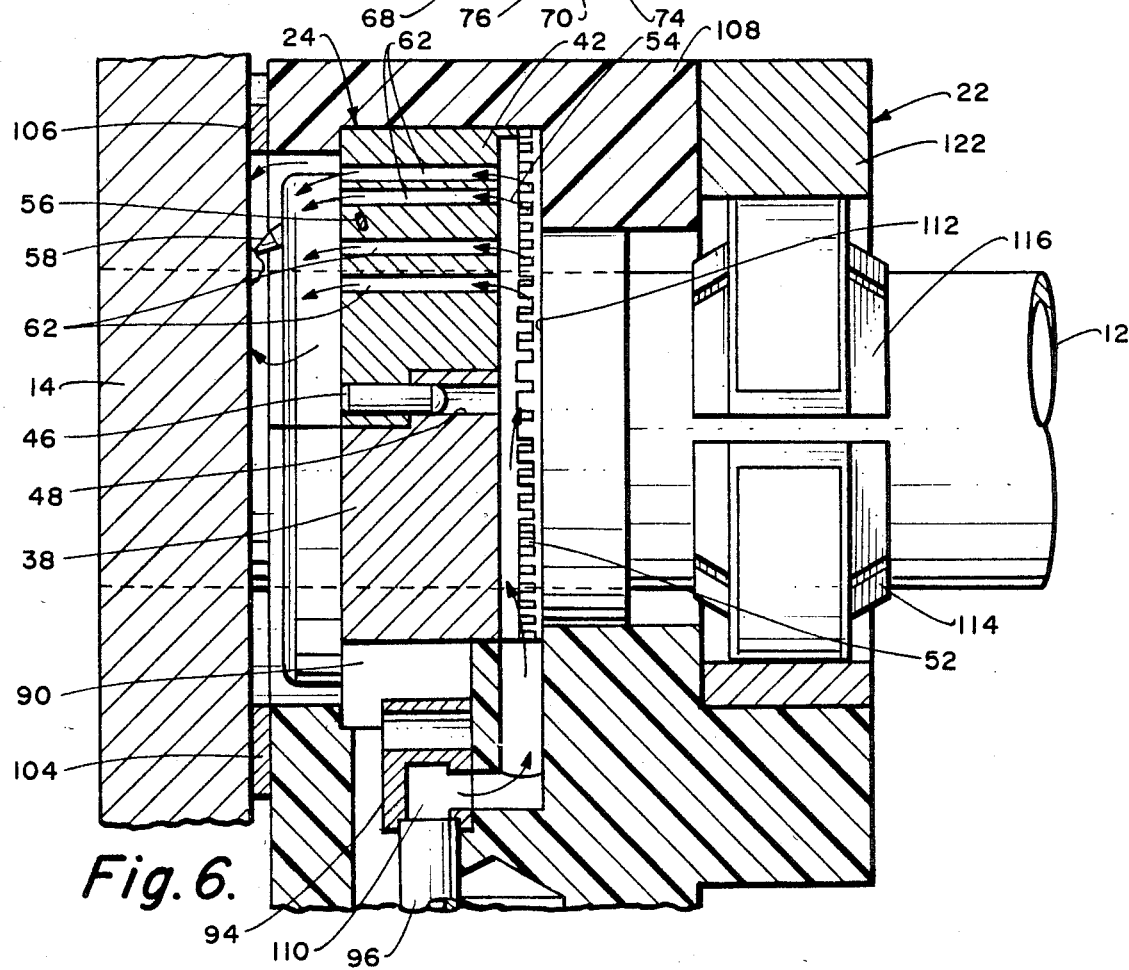
FIG. 6 is a cross-sectional view taken along line 6—6 of FIG. 4 showing the path of flow of the inert gas to the tip of the welding electrode.

Referring particularly to the drawings, there is shown the welding apparatus 10 of this invention, which is to be utilized to weld a tube 12 to a tube sheet 14. Formed within the tube sheet 14 are a plurality of equidistantly spaced-apart holes 16. Within each hole, there is to be snugly located a tube 12. The material of construction of both the tube 12 and the tube sheet 14 will normally be a metal, such as stainless steel.

Located about each of the holes 16 is a trepanned groove 18. The trepanning assists in forming a weld of the highest quality. The use of trepanning is deemed to be conventional and does not constitute an inventive feature of this invention.

The tube 12 is to extend through a through opening 20 formed within the welding head housing 22. Through opening 20 extends through a gas cup which is formed of abutting half sections 26 and 28. The preferable material of construction for the gas cup would be a boron nitride. Boron nitride is a non-electrically conductive plastic which is capable of withstanding exceedingly high temperatures.

Half section 26 includes a bore 30 located entirely through the wall surface of the half section 26. A similar bore 32 is formed within the half section 28. When the half sections 26 and 28 are located in abutting relationship, the bores 30 and 32 are located diametrically opposite each other with respect to the longitudinal center axis of the tube 12.

Within the bore 30 is located a pin 34. A similar pin 36 is located within the bore 32. The pin 34 extends within a mating aperture formed within the first ring gear section 38. A set screw 40 is threadably secured through a portion of the first ring gear section 38 and is adapted to engage with the pin 34. In a similar manner, a set screw (not shown) is to connect with an appropriate threaded opening formed within the second ring gear section 42 and is to tightly engage with the pin 36.

It is to be understood that the connection of the set screw 40 with the pin 34 securely holds the first ring gear section 38 in position abutting against the half section 26. Similarly, the set screw (not shown) that connects with the pin 36 is for the purpose of holding in position the second ring gear section 42 on the half section 28. The ring gear sections 38 and 42 are to connect together through an abutting flange assembly and are to be securely held in this position by means of pins 44 and 46. The pins 44 and 46 are fixedly mounted within the second ring gear section 42 and protrude therefrom. The protruding portion of each of the pins 44 and 46 are to connect in a close fitting manner within an appropriate bore formed within the first ring gear section 38 with only bore 48 being shown for the pin 46.

Formed within the back edge of the first ring gear section 38 is a half circle ring gear 52. A similar half circle ring gear 54 is formed within the back surface of the second ring gear section 42. The half circle ring gears 52 and 54 connect together to form a single ring gear.

Located within the second ring gear section 42 is an inclined opening 56. It is to be noted that inclined opening 56 is not centrally disposed within the arcuate length of the second ring gear section 42. This is strictly a matter of design choice so that inclined opening 56 does not interfere with the bore 32.

Mounted within the inclined opening 56 in a sliding, close fitting manner is a welding electrode 58. The welding electrode 58 protrudes exteriorly, or forwardly, of the half section 28. The welding electrode 58 is to be extended a desired distance to achieve the proper weld and then fixed in that position by means of set screw 60.

Also formed within the second ring gear section 42 are four in number of openings 62. Two in number of the openings 62 are located on one side of the electrode 58, with the other two in number being located on the other side of the electrode 68. The function of the openings 62 will be explained further on in the specification.

Either the first ring gear section 38 or the second ring gear section 42 is to be positioned within groove 64 of fixed housing section 66 of the welding head housing 22. A small internal chamber is formed within the fixed housing section 66, within which is located the pinion gear 68. The pinion gear 68 is engaged either with the ring gear section 52 or 54. The pinion gear 68 is attached to a shaft 70. The shaft 70 extends through an opening 72 formed within a sleeve 74. The sleeve 74 is fixedly mounted within enlarged opening 76 formed within fixed housing section 66 of the welding head housing 22. The lower end of the shaft 70 is fixedly mounted by set screw 78 within a phenolic bushing 80. The shaft 82 from the motor 84 extends within a bore formed within the bushing 80. The shaft 82 is secured to the bushing 80 by means of a cross pin 86. The motor, as well as a portion of the bushing 80, is encased by a cover 88. The cover 88 is fixedly secured to the fixed housing sections 66.

In order to supply electrical energy to the electrode 58, such is transmitted to half sections 38 and 42 of the welding electrode housing 24. The half sections 38 and 42 rotate within the welding head housing 22. It is necessary that a continual and positive supply of electrical energy be conducted to the rotating sections 38 and 42. This is accomplished through the use of bifurcated or U-shaped connector 90. Each leg of the connector 90 is biased by the inherent resiliency of the connector 90 into tight and positive engagement with the sections 38 and 42. The connector 90 is fixedly mounted by fasteners 92 to a block 94. The block 94 is electrically conductive. The fasteners 92 connect within appropriate threaded openings formed within the fixed housing 66.

Connected to the block 94 is a conduit connection 96. Conduit connection 96 connects with a conduit 98. The electrical current is conducted by means of a cable 100, through the conduit 98, to the connection 96, through the block 94, to the connector 90, through the ring gear sections 38 and 42 to the welding electrode 58. The block 94 is also securely held in position to the fixed housing 66 by means of a mounting screw 102.

Attached to the front face of the fixed housing section 66 is a half circle spacer ring 104. A similar half circle spacer ring 106 is fixedly mounted on the front face of a movable housing 108 of the welding head housing 22.

The spacer rings 104 and 106 cooperate together to form an almost closed ring. The function of the spacer rings 104 and 106 is with such abutting against the back surface of the tube sheet 14, the welding electrode 58 is positioned the correct distance from the weld area to produce the highest quality weld. The spacer ring 104 does not connect with the spacer ring 106 with a pair of diametrically opposed gaps located therebetween. The reason for these gaps is to provide a restricted outlet passage for the inert gas which is supplied to the welding area. The inert gas is supplied through the conduit 96, through passage 110 formed within block 94, and into internal chamber 112. Within the internal chamber 112 is located the ring gear sections 52 and 54. The inert gas within the internal chamber 112 is conducted within the opening 62 to be discharged directly adjacent the tip of the welding electrode 58.

In order to secure the welding head housing 22 to the tube 12, there is utilized a clamping assembly which includes clamp members 114 and 116. Both clamp members 114 and 116 are substantially semi-circular with the inner surface of each being adapted to be placed directly onto the exterior surface of the tube 12. The longitudinal center axis of the area enclosed by the clamp members 114 and 116 coincides with the longitudinal center axis of the tube 12.

The clamp member 114 is secured by means of a conventional screw threaded fastener 118 to a portion of the fixed housing 66. Clamp member 116 is secured by means of bolt fastener 120 to a mounting block 122. The mounting block 122 is in turn fixedly secured by a fastener assembly 124 (actually, three in number of fasteners 124) to movable housing 108. The connection between fixed housing 66 and the movable housing 108 is accomplished through the use of a pair of elongated bolts 126 and 128.

In order to insure that each time the movable housing 108 is connected to fixed housing 66, it is located in precisely the exact position each time, there is mounted within one side of the housing 66 an alignment pin 130 and in the other side of the housing 66, a second alignment pin 132. The pin 130 connects in a mating manner within a recess 134 formed within the movable housing 108. Similarly, the pin 132 connects within a mating recess 136 formed within the movable housing 108.

The operation of the welding apparatus 10 of this invention is as follows: It will be assumed that the movable housing 108 is attached to the fixed housing 66 and it is desired to mount the welding apparatus 10 in conjunction with a tube 12. In order to accomplish this, the operator loosens bolts 126 and 128 until movable housing 108, as well as mounting block 122, can be separated from the fixed housing 66. The operator then longitudinally moves first ring gear section 38 so that pin 46 is disengaged from its respective bore 48 and pin 44 is disengaged from its respective bore (not shown). This results in second ring gear section 42 being separated from first ring gear section 38.

The operator then proceeds to place the fixed housing 66 at a desired location adjacent the tube 12 which is to be welded to the tube sheet 14. The placement is such that the half spacer ring 104 is in contact with the back face of the tube sheet 14. The operator then replaces the second ring gear section 42 in position with the pins 44 and 46 being located within their respective bores forming an enclosing ring comprised of ring gear sections 38 and 42 located about the tube 12. The operator then places the movable housing 108 and the mounting block 22 in position to engage with the alignment pins 130 and 132.

The operator then proceeds to tighten fasteners 126 and 128, which tightly draws the clamping members 114 and 116 into contact with the exterior surface of the tube 12. A desired amount of tightening is obtained. At this paticular time, the movable housing 108 is held in position with respect to the fixed housing 166. Also, the half spacer ring 106 is in contact with the back face of the tube sheet 14.

The welding apparatus 10 of this invention is to be hooked up to an appropriate monitoring apparatus which will take the form of a computer. The computer is to monitor the welding current, welding voltage, as well as supply the electrical power to the motor 84 so as to rotate the ring gear sections 38 and 42, which in turn causes the welding electrode 58 to be rotated about the tube 12 in order to produce the weld 138. Once the desired weld 138 is obtained, the welding apparatus 10 is removed from this particular tube 12 to another tube 12 to repeat the procedure.

What is claimed is:

1. A welding apparatus for welding of a plurality of assembled tubes to the back face of a tube sheet comprising:

a welding head housing having an internal chamber, said welding head housing having a front surface and a rear surface, said internal chamber being open ended so a said tube is capable of extending therethrough, said front surface to abut against said back face of said tube sheet;

a welding electrode housing mounted within said internal chamber, said welding electrode housing being capable of rotative movement relative to said welding head housing, said welding electrode housing being capable of being split in two separate halves, said two separate halves being securable together by securing means about said tube, a welding electrode being mounted within said welding electrode housing, said welding electrode housing being electrically conductive, said welding electrode housing including a ring gear;

a pinion gear being in continuous engagement with said ring gear, said pinion gear being mounted on a shaft, said shaft being rotated by a motor;

a clamping assembly mounted on said welding head housing, said clamping assembly being movable between a clamping position and a release position, said clamping position tightly securing said welding head housing to the said tube, said release position permitting disengagement of said welding head housing from said tube;

an inert gas passage assembly formed within said welding head housing;

an electrical connector connecting with said welding electrode housing, said electrical connector to conduct electrical energy to said welding electrode housing, said electrical connector being continuously biased into contact with said welding electrode housing forming a sliding fit therebetween; and said welding head housing includes a spacer ring, said spacer ring being mounted on said front surface of said welding head housing, said spacer ring being concentrically disposed relative to the said tube that is being welded to said tube sheet, said spacer ring being separatable into two separate halves forming a pair of diametrically disposed gaps therebetween, said gaps forming restrictive inert gas outlet passages for inert gas that is supplied to the tip of said welding electrode through said inert gas passage assembly, said spacer ring to abut said back face of said tube sheet.

2. The welding apparatus as defined in claim 1 wherein:

said welding head housing being formed of a first part and a second part, said clamping assembly being formed of a third part and a fourth part, said third part being fixedly secured to said first part, said fourth part being fixedly secured to said second part, fastening means connected to said clamping assembly, said fastening means to secure together said third part and said fourth part thereby securing together said first part and said second part locating said clamping assembly in said clamping position.

3. The welding head apparatus as defined in claim 1 wherein:

said inert gas passage assembly including an annular gas chamber located within said internal chamber, said ring gear being located within said annular gas chamber.

4. The welding apparatus as defined in claim 1 wherein:

said inert gas passage assembly including an inlet gas supply conduit, said inlet gas supply conduit being connected to said welding head housing, an electrical conducting cable being connected to said electrical connector, said electrical conducting cable to supply electrical energy to said welding electrode housing, said electrical conducting cable extending through said inlet gas supply conduit.

* * * * *